United States Patent [19]

Yamanaka et al.

[11] Patent Number: 5,781,462
[45] Date of Patent: Jul. 14, 1998

[54] MULTIPLIER CIRCUITRY WITH IMPROVED STORAGE AND TRANSFER OF BOOTH CONTROL COEFFICIENTS

[75] Inventors: Kazuya Yamanaka; Sumitaka Takeuchi, both of Itami, Japan

[73] Assignee: Mitsubishi Denki Kabushiki Kaisha, Tokyo, Japan

[21] Appl. No.: 530,580

[22] Filed: Sep. 19, 1995

[30] Foreign Application Priority Data

Nov. 29, 1994 [JP] Japan ................... 6-294109

[51] Int. Cl.$^6$ .............. G06F 17/10; G06F 7/52
[52] U.S. Cl. ............... 364/724.16; 364/760.01
[58] Field of Search ............... 364/760, 724.16, 364/760.01, 760.02, 760.03, 760.04, 760.05

[56] References Cited

U.S. PATENT DOCUMENTS

| | | | |
|---|---|---|---|
| 4,153,938 | 5/1979 | Ghest et al. | 364/760 |
| 4,238,833 | 12/1980 | Ghest et al. | 364/760 |
| 4,546,446 | 10/1985 | Machida | 364/759 |
| 4,796,219 | 1/1989 | Williams | 364/758 |
| 4,866,715 | 9/1989 | Van Meerbergen et al. | 371/27 |
| 5,040,139 | 8/1991 | Tran | 364/760 |
| 5,235,538 | 8/1993 | Sumi et al. | 364/760 |
| 5,291,431 | 3/1994 | Ho et al. | 364/760 |
| 5,475,628 | 12/1995 | Adams et al. | 364/724.1 |
| 5,594,675 | 1/1997 | Peng | 364/724.1 |

FOREIGN PATENT DOCUMENTS

| | | |
|---|---|---|
| 62-154029 | 7/1987 | Japan . |
| 64-10325 | 1/1989 | Japan . |
| 6 214761 | 8/1994 | Japan . |

*Primary Examiner*—Reba I. Elmore
*Assistant Examiner*—Robert J. Dolan
*Attorney, Agent, or Firm*—Oblon, Spivak, McClelland, Maier & Neustadt, P.C.

[57] ABSTRACT

It is an object of the present invention to simplify a multiplier so as to reduce the circuit scale of a digital filter which uses a large number of multipliers. Outputs of a Booth decoder 4 are stored in registers $5_1$-$5_{(n+1)/2}$ provided corresponding to partial product generating circuits $106_1$-$106_{(n+1)/2}$. By providing control signals from the registers $5_1$-$5_{(n+1)/2}$ to the partial product generating circuits $106_1$-$106_{(n+1)/2}$, the Booth decoder 4 is made common. The number of Booth decoders which have conventionally been provided in a one-to-one correspondence with the partial product generating circuits can be reduced to one and the multiplier can be simplified.

2 Claims, 12 Drawing Sheets

1

MULTIPLIER CIRCUITRY WITH IMPROVED STORAGE AND TRANSFER OF BOOTH CONTROL COEFFICIENTS

BACKGROUND OF THE INVENTION

1. Field of the Invention

The present invention relates to multipliers with multiplier factors fixed all through a plurality of times of multiplications and digital filters including such multipliers, and in particular to simplification of configuration of a digital filter with a coefficient determined and fixed at the initial time of circuit operation.

2. Description of the Background Art

The digital filter is a representative example of semiconductor integrated circuits having multipliers with fixed multiplier factors. The digital filters are now in wide use in place of the analog filters in the fields of communication and public welfare with the development of the digital signal processing technique.

In the case of a multiplier used in the digital filter, a coefficient of the digital filter is a multiplier factor and the input data is a multiplicand. In most applications of the digital filter, the coefficient is previously set (loaded before operation), and fixed during operation of the digital filter. Accordingly, the multiplier factor Y is fixed while the multiplier is operating. The improvement of precision and processing speed of the digital filters are based on the processing precision and speed of the multipliers.

General configuration of a conventional digital filter will now be described using FIG. 11 through FIG. 14. The digital filter is a product-sum operation circuit which is often used in the digital signal processing, which is comprised of registers for holding the coefficients or for sequentially delaying the data inputted one after another, multipliers for multiplying the coefficients and the data and an adder for adding all the multiplication results.

FIG. 11 is a block diagram showing an example of the configuration of a conventional digital filter. In FIG. 11, 100 denotes a read-only memory (referred to as ROM, hereinafter) for reading stored coefficients according to the output of a counter 99. $101_1$-$101_i$ denote coefficient registers for holding the coefficients read from the ROM 100. $102_1$-$102_i$ denote data registers provided corresponding to the coefficient registers $100_1$-$101_i$, for holding the input data X. $103_1$-$103_i$ denote multipliers supplied with information stored in the respective coefficient registers $101_1$-$101_i$ and the respective data registers $102_1$-$102_i$ as inputs for outputting products thereof, and 104 denotes an adding portion supplied with the multiplication results of the multipliers $103_1$-$103_i$ as inputs and outputting the total sum thereof. In the multiplier 103, 105 denotes a Booth decoder group including a plurality of Booth decoders for generating control signals which instruct computation of partial products according to values of 3 bits. 106 denotes a partial product generating circuit group including a plurality of partial product generating circuits for performing computation of partial products according to the plurality of control signals outputted from the Booth decoder group 105, and 107 denotes a partial product adding portion for computing the total sum of the plurality of partial products outputted from the partial product generating circuit group 106.

Circuits which perform digital signal processing are characterized by including parts configured by repeating unit circuits. The reference character TA in FIG. 11 denotes a circuit formed of one coefficient register, a data register and

2 a multiplier, which is a unit circuit called a tap of the digital filter. A digital filter may include about 100 units of taps TA, for example. The circuit scale of a digital filter is determined by the number of bits of coefficients and data and the number of taps.

Conventionally, it has been considered to decrease the number of partial products so as to reduce the area of the multipliers, and the Booth's algorithm is most frequently used in generation of the partial products.

FIG. 12 is a block diagram showing an example of configuration of a multiplier for performing multiplication of the multiplier factor Y and the multiplicand X. The multiplier shown in FIG. 12 is a multiplier which performs multiplication using the Booth's algorithm. In FIG. 12, $105_1$-$105_{(n+1)/2}$ denote individual Booth decoders forming the Booth decoder group 105 and $106_1$-$106_{(n+1)/2}$ denote partial product generating circuits provided corresponding to the Booth decoders $105_1$-$105_{(n+1)/2}$ and forming the partial product generating circuit group 106.

In the Booth's algorithm, on the basis of 3 bits ($y_{2i-1}$, $y_{2i}$, $y_{2i+1}$) of the multiplier factor Y, 0X, ±X, ±2X of the multiplicand X are outputted as partial products. In the form where a negative number is twos-complement displayed, the multiplier factor Y can be expressed as the expression 1. If n is an even number, then the multiplier factor Y can be rewritten as the expression 2.

$$Y = -y_{n-1} \cdot 2^{n-1} + \sum_{i=0}^{n-2} y_i \cdot 2^i \qquad \text{Expression 1}$$

$$Y = \sum_{i=0}^{n/2-1} (y_{2i-1} + y_{2i} - 2 \cdot y_{2i+1}) \cdot 2^{2i} \qquad \text{Expression 2}$$

(note that $y_{-1} = 0$)

Now, ($y_{i-1} + y_{2i} - 2y_{2i+1}$) can take values of 0, X, −X, 2X, −2X in accordance with values of successive 3 bits of the multiplier factor Y. The relation between the successive 3 bits and the partial products is shown in Table 1. It is, in all outputs, ANDed with 0 to provide 0, it is outputted as it is to output X, and it is left-shifted by one bit to generate 2X. In order to generate the negative numbers (−X, −2X), the multiplicand is negated and 1 is added to the LSB of the NOT of the multiplicand.

TABLE 1

| $y_{2i-1}$ | $y_{2i}$ | $y_{2i+1}$ | Partial Product ($y_{2i-1} + y_{2i} - 2 \cdot y_{2i+1}$) x |
|---|---|---|---|
| 0 | 0 | 0 | 0 |
| 0 | 0 | 1 | −2x |
| 0 | 1 | 0 | x |
| 0 | 1 | 1 | −x |
| 1 | 0 | 0 | x |
| 1 | 0 | 1 | −x |
| 1 | 1 | 0 | 2x |
| 1 | 1 | 1 | 0 |

As has been described above, in order to generate partial products, a decode circuit for making selection as to which processing (0, X, −X, 2X, −2X) in the Table 1 is to be performed and a partial product generating circuit for performing respective processings are used. Then, the partial products outputted by the partial product generating circuit group 106 are all added in the partial product add portion 107 to obtain a multiplication result of the multiplier factor Y and the multiplicand X.

FIG. 13 is a circuit diagram showing the configuration of the Booth decoders $105_1$-$105_{(n+1)/2}$ for performing the Booth's algorithm using successive 3 bits. In FIG. 13, 81 denotes an exclusive OR element for exclusive-ORing the bits $y_{i-1}$, $y_{2i}$ of the multiplier factor Y, 82 denotes a NOT exclusive OR element for exclusive-ORing the bits $y_{2i}$, $y_{2i+1}$ of the multiplier factor Y and outputting NOT thereof. 83 denotes a NOT element for negating the output of the exclusive OR element 81 to obtain a control signal $C_1$. 84 denotes a NOT element for negating the output of the NOT exclusive OR element 82. 85 denotes a transfer gate which is supplied with the output of the NOT exclusive OR element 82 and the output of the NOT element 84 as inputs at its gate and goes into a conducting state when the output of the NOT exclusive OR element 82 is at a high level to pass the output of the NOT element 83. 86 denotes a NOT element having the transfer gate 85 as its input for negating and outputting the signal which has passed through the transfer gate 85, and 87 denotes an N-channel MOS transistor having its drain and gate connected to the input terminal of the NOT element 86 and the ground potential point and its gate supplied with the output of the NOT element 84 as inputs, for bringing the input terminal of the NOT element 86 to the ground potential when the transfer gate 85 is in a not-conducting state. The output of the NOT element 86 is regarded as a control signal $C_3$, and the bit $y_{2i+1}$ of the multiplier factor Y is regarded as a control signal $C_2$. Now, the control signal $C_3$ outputted from the Booth decoder shown in FIG. 13 is an enable signal for generating 0.X, the control signal $C_2$ is an inversion signal for separately creating −X and −2X, and the control signal $C_1$ is a shift signal for separately creating +X and +2X.

Next, one example of the configuration of the partial product generating circuits $106_1$-$106_{(n+1)/2}$ for generating partial products in accordance with the control signals $C_1$-$C_3$ outputted by the Booth decoders $105_1$-$105_{(n+1)/2}$ will be described using FIG. 14. In FIG. 14, 91 denotes a NOT element for outputting NOT of the control signal $C_1$. 92 denotes a transfer gate which allows K-th bit $x_k$ forming the data X to pass when the control signal $C_1$ is at a high level and does not allow the $bit_k$ to pass when it is at a low level. 93 denotes a transfer gate which allows the bit $x_{k+1}$ forming the data X when the control signal $C_1$ is at a low level and does not allow the bit $x_{k+1}$ when it is at a high level. 94 denotes an exclusive OR element having one of its inputs connected to outputs of both the transfer gates 92 and 93 and the other input connected to the control signal $C_2$. 95 denotes a NAND element having one of its inputs connected to the output of the exclusive OR element 94 and the other input connected to the control signal $C_3$, and 96 denotes a NOT element for outputting NOT of the output of the NAND element 95. Each of the partial product generating circuit $106_1$-$106_{(n+1)/2}$ is provided with the circuit shown in FIG. 14 by the number corresponding to the number of bits. The operation of the circuit shown in FIG. 14 is shown in Table 2.

TABLE 2

| Sift Signal $C_1$ | Inversion Signal $C_2$ | Enable Signal $C_3$ | Output |
|---|---|---|---|
| 0 | 0 | 0 | 0 |
| 1 | 0 | 0 | 0 |
| 0 | 1 | 0 | 0 |
| 1 | 1 | 0 | 0 |
| 0 | 0 | 1 | $x_{k+1}$ |
| 1 | 0 | 1 | $x_k$ |
| 0 | 1 | 1 | $\overline{x_{k+1}}$ |
| 1 | 1 | 1 | $\overline{x_k}$ |

The respective partial product generating circuits $106_1$-$106_{(n+1)/2}$ shown in FIG. 12 generate 0, X, ±X, ±2X, which are partial products of the multiplicand X, using a plurality of circuits shown in FIG. 14 with the control signals $C_1$-$C_3$ of the Booth decoder shown in FIG. 13.

With the trend toward digitization in the recent communication, image signal processing, aural signal processing, etc., the number of bits of the coefficients and data of digital filters is increasing and the number of required taps is also going on increasing. The conventional digital filters, which are configured as described above, are manufactured generally by using the semiconductor integrated circuit technique, where there have been such problems as high manufacturing cost, inferior yield in manufacturing, etc., as the circuit scale increases and then the area for one chip increases.

SUMMARY OF THE INVENTION

A first aspect of the present invention is directed to a multiplier which performs multiplication, with a fixed multiplier factor and a multiplicand inputted one after another, by further adding one bit to the least significant position of all bits forming the multiplier factor, dividing the series of bits into sets of successive three bits by shifting the bits to the high order two bits by two bits from the least significant three bits, obtaining partial products of the multiplicand according to the Booth's algorithm for each set of the three bits and obtaining the total sum thereof. According to the present invention, the multiplier comprises: a plurality of partial product generating circuits provided corresponding to the respective sets of three bits, each supplied with a control signal determined by a value of the corresponding set of three bits and the multiplicand as inputs, for generating the partial products of the multiplicand for the respective sets of three bits, respectively; a plurality of control signal storage means provided corresponding respectively to the plurality of partial product generating circuits each for storing the control signal in accordance with the value of the corresponding one of the sets of three bits; a decoder sequentially supplied with bits forming the multiplier factor as inputs, for sequentially generating the control signals from the values of the sets of three bits and sequentially outputting them to the control signal storage means corresponding to the respective sets of three bits; and a partial product adding circuit for computing the total sum of the plurality of partial products generated by the plurality of partial product generating circuits.

The present invention is also directed to a digital filter. According to a second aspect of the present invention, the digital filter comprises: a plurality of multiplication means for computing products of two inputs, a plurality of data storage means provided corresponding respectively to the plurality of multiplication means for storing data provided to the multiplication means, a plurality of coefficient storage means provided corresponding respectively to the plurality of multiplication means for providing a coefficient to the multiplication means and adding means for obtaining the total sum of outputs of the plurality of multiplication means, each of the plurality of multiplication means comprising a plurality of partial product generating circuits for computing, for each set of successive three bits provided by shifting a series of bits with one bit added to the least significant position of all bits forming the coefficient to the high order by two bits from the least significant three bits, partial products according to the Booth's algorithm in accordance with control signals determined by values of the set of three bits, and a partial product adding circuit for computing the total sum of the plurality of partial products generated by the plurality of partial product generating circuits, and each of the plurality of coefficient storage means comprising a plurality of control signal storage means provided correspondingly respectively to the plurality of partial product generating circuits of the corresponding multiplication means for storing the control signals.

Preferably, the digital filter according to a third aspect of the present invention further comprises a plurality of decoders provided in common to the plurality of multiplication means and corresponding respectively to the plurality of partial product generating circuits in the multiplication means, for sequentially performing to the plurality of coefficient storage means an operation of respectively receiving the sets of three bits as inputs, respectively generating the control signals and respectively outputting the same to the plurality of control signal storage means.

In a fourth aspect of the present invention, a digital filter comprises: a plurality of multiplication means for computing products of two inputs, a plurality of data storage means provided corresponding respectively to the plurality of multiplication means for storing data provided to the multiplication means, a plurality of coefficient storage means provided corresponding respectively to the plurality of multiplication means for providing a coefficient to the multiplication means and adding means for obtaining the total sum of outputs of the plurality of multiplication means, each of the plurality of multiplication means comprising a plurality of partial product generating circuits for computing, for each set of successive three bits provided by shifting a series of bits with one bit further added to the least significant position of all bits forming the coefficients to the high order by two bits from the least significant three bits, partial products according to the Booth's algorithm in accordance with control signals determined by values of the sets of three bits, and a partial product adding circuit for computing the total sum of the plurality of partial products generated by the plurality of partial product generating circuits, and each of the plurality of coefficient storage means comprising a plurality of control signal storage means provided corresponding respectively to the plurality of partial product generating circuits of corresponding one of the multiplication means and connected in series, for shifting the control signals sequentially inputted and storing the corresponding control signals, respectively.

Preferably, according to a fifth aspect of the present invention, the digital filter further comprises a decoder sequentially supplied with the series of bits corresponding to the plurality of multiplication means as inputs for sequentially generating the control signals for each of the sets of three bits and outputting the same to the plurality of coefficient storage means.

If a multiplier factor X is formed of n+1 bits, $x_0$-$x_n$, for example, the single decoder in the first aspect of the present invention generates and sequentially outputs a control signal corresponding to an added one bit, $x_0$, $x_1$, a control signal corresponding to $x_1$, $x_2$, $x_3$, . . . , a control signal corresponding to $x_{n-2}$, $x_{n-1}$, $x_n$ according to sequentially inputted bits $x_0$-$x_n$ of the multiplier factor. The control signal storage means provided corresponding to the plurality of partial product generating circuits store the control signal corresponding to the added one bit, $x_0$, $x_1$, the control signal corresponding to $x_1$, $X_2$, $X_3$, . . . , the control signal corresponding to $x_{n-2}$, $x_{n-1}$, $x_n$, respectively. Then, the partial product generating circuits generate and output partial products in accordance with the Booth's algorithm according to the control signals stored in the control signal storage means. Accordingly, a single decoder is enough for the plurality of partial product generating circuits and therefore the number of decoders can be reduced.

According to the multiplier of the first aspect, the number of decoders can be reduced and therefor it has the effect of reducing the circuit scale of the multiplier.

The coefficient storage means in the second aspect is provided with a plurality of control signal storage means which store control signals. The partial product generating circuits of the multiplication means can generate partial products according to the Booth's algorithm with the control signals stored in the corresponding control signal storage means. Accordingly, it is not necessary to provide in the multiplication means decoders or the like for changing the coefficient into control signals corresponding to the number of the partial product generating circuits.

The digital filter of the second aspect has the effect of reducing the circuit scale of the digital filter because there is no need of decoding from the coefficient in the multiplication means and the decoders in the multiplication means can be removed.

According to the plurality of decoders in the third aspect of the invention, if a coefficient X is formed of n+1 bits, $x_0$ to $x_n$, for example, each decoder generates and outputs a control signal corresponding to an added one bit, $x_0$, $x_1$, a control signal corresponding to $x_1$, $x_2$, $X_3$, . . . , a control signal corresponding to $x_{n-2}$, $x_{n-1}$, $x_n$. It is performed to the coefficient storage means to provide contents of storage to the control signal storage means provided in all the coefficient storage means. Accordingly, it is enough to provide decoders by the number of control signal storage means provided in one coefficient storage means, where if the required number of coefficients is 100, 99×(the number of control signal storage means in one coefficient storage means) of decoders can be removed in comparison with the conventional case.

According to the digital filter of the third aspect of the invention, the number of decoders can be reduced and hence the circuit scale can be reduced in a digital filter which is capable of direct input of coefficients.

The coefficient storage means in the fourth aspect of the invention is provided with a plurality of control signal storage means storing control signals. The partial product generating circuits in the multiplication means can generate partial products according to the Booth's algorithm with the control signals stored in corresponding control signal storage means. Accordingly, it is not necessary to provide decoders and the like for changing the coefficients into control signals corresponding to the number of the partial product generating circuits in the multiplication means. Furthermore, the control signal storage means are connected in series and shift the sequentially inputted control signals, so that the number of signal lines can be reduced, where the number of signal lines for transmitting control signals to the plurality of control signal storage means in one coefficient storage means can be reduced to one, for example.

The digital filter according to the fourth aspect of the present invention has the effect of reducing the circuit scale of the digital filter because the decoders in the multiplication means can be reduced, for there is no need of decoding from the coefficient in the multiplication means. It also has the effect of reducing the number of terminals for providing the control signals to the control signal storage means because the control signals are shifted.

If a coefficient X is formed of n+1 bits; $x_0$-$x_n$, for example, the coefficient storage means in the fifth aspect of the present invention sequentially generates and sequentially outputs the control signal corresponding to an added one bit, $x_0$, $x_1$, the control signal corresponding to $x_1$, $X_2$, $X_3$, . . . , the control signal corresponding to $x_{n-2}, x_{n-1}, x_n$ according to the sequentially inputted bits $x_0$-$x_n$ of the coefficient. The control signal storage means provided corresponding to the plurality of partial product generating circuits store the control signal corresponding to the added one bit, $x_0, x_1$, the control signal corresponding to $x_1, X_2, X_3, \ldots$, and the control signal corresponding to $x_{n-2}, x_{n-1}, x_n$, respectively. Then, the partial product generating circuits generate and output partial products in accordance with the Booth's algorithm according to the control signals stored in the control signal storage means. Accordingly, a single decoder is enough for a single digital filter, for example, and therefore the number of decoders can be reduced. Hence, if required number of coefficients is 100 in the digital filter, (100×(the number of control signal means in a single coefficient storage means)−1) of decoders can be removed as compared with the conventional cases.

The digital filter of the fifth aspect of the present invention has the effect of diminishing the circuit scale of the digital filter capable of directly input of coefficients.

The present invention has been made to solve the problems described before and it is an object of the present invention to decrease the number of Booth decoders in a multiplier by utilizing that the coefficient processed in each multiplier existing in each tap is fixed during operation so as to decrease the area of the digital filter.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
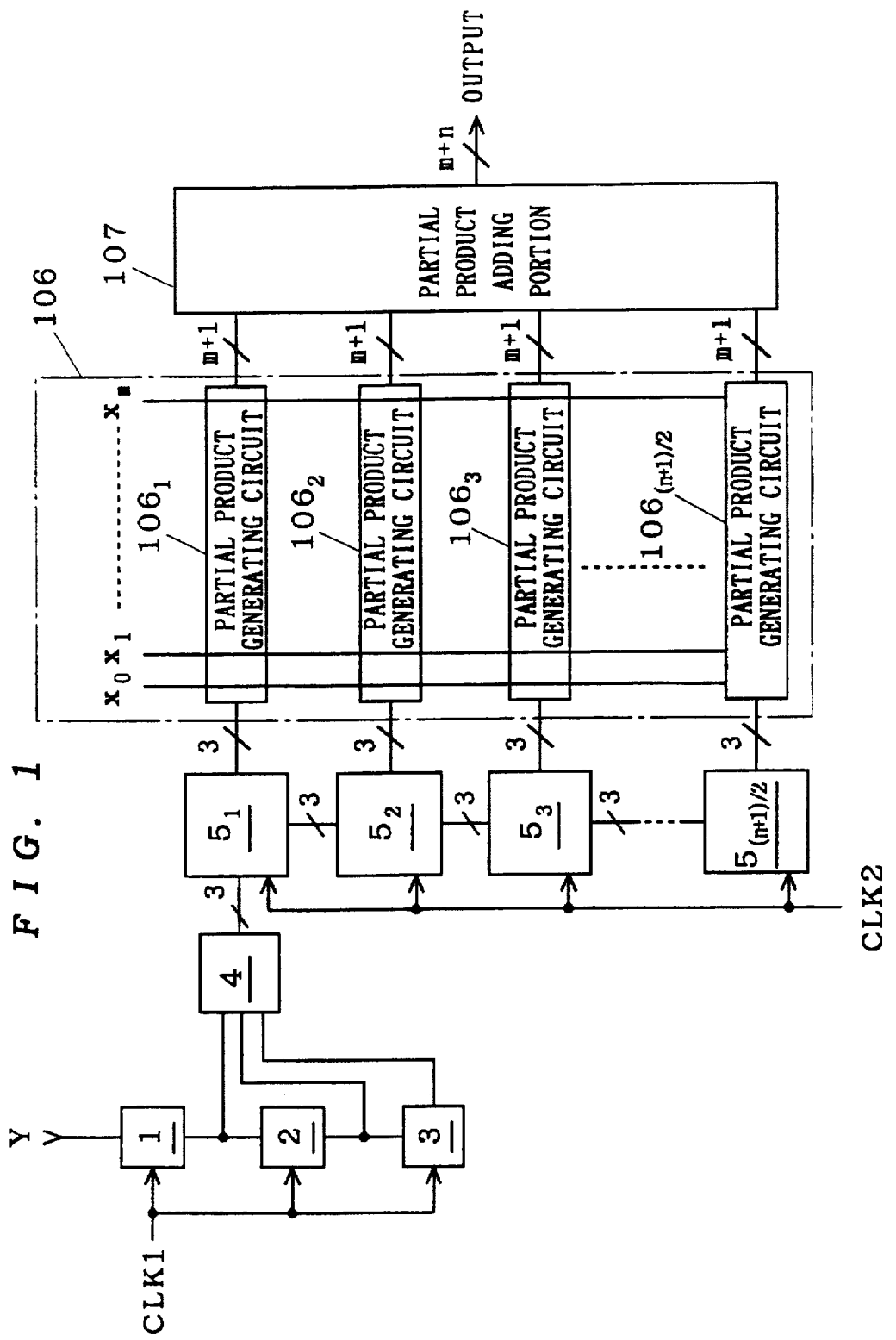
FIG. 1 is a block diagram showing the configuration of a multiplier according to the first preferred embodiment of the present invention.
Figure 2:
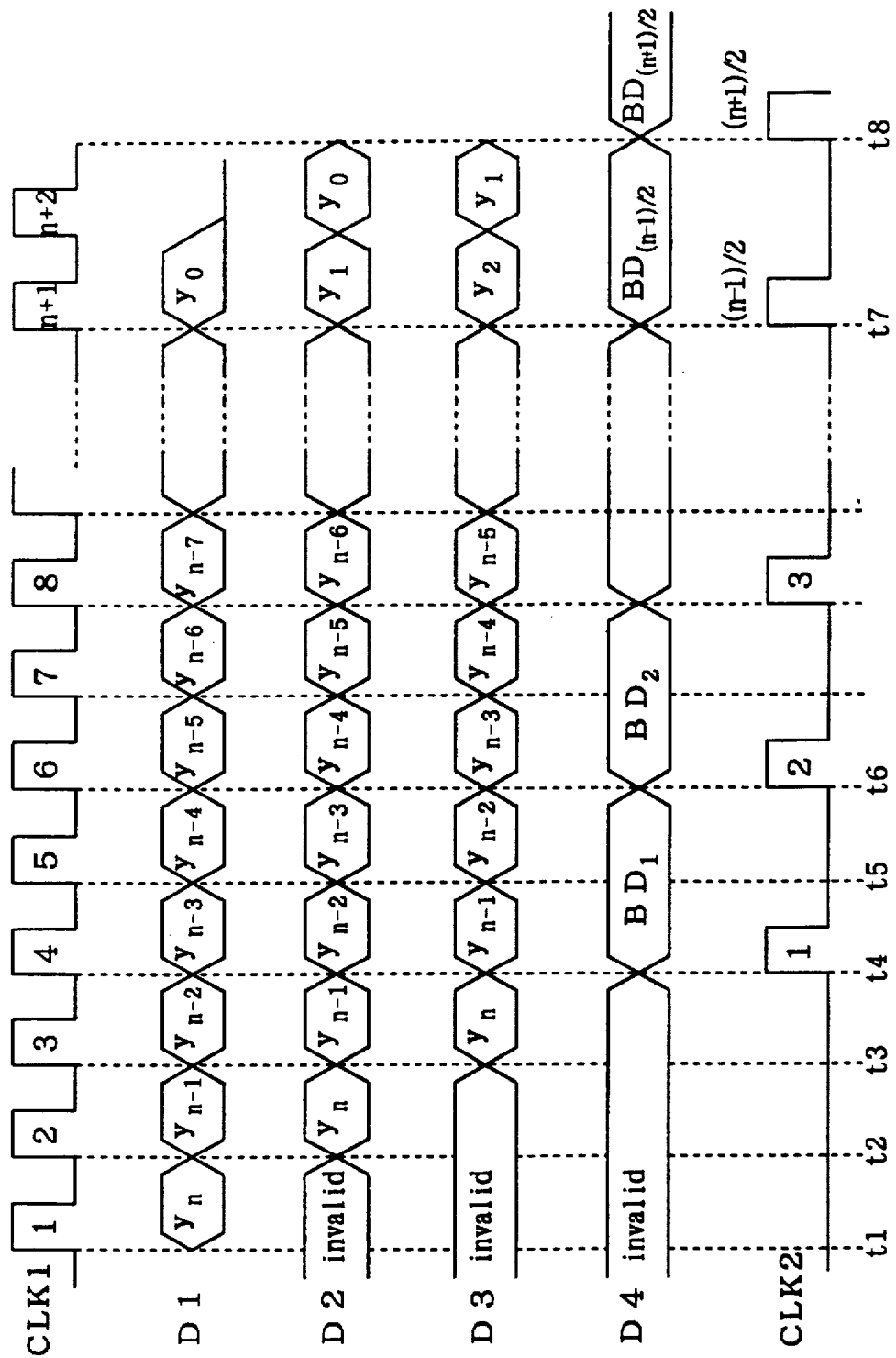
FIG. 2 is a timing chart showing the operation of the multiplier used in the digital filter shown in FIG. 1.
Figure 3:
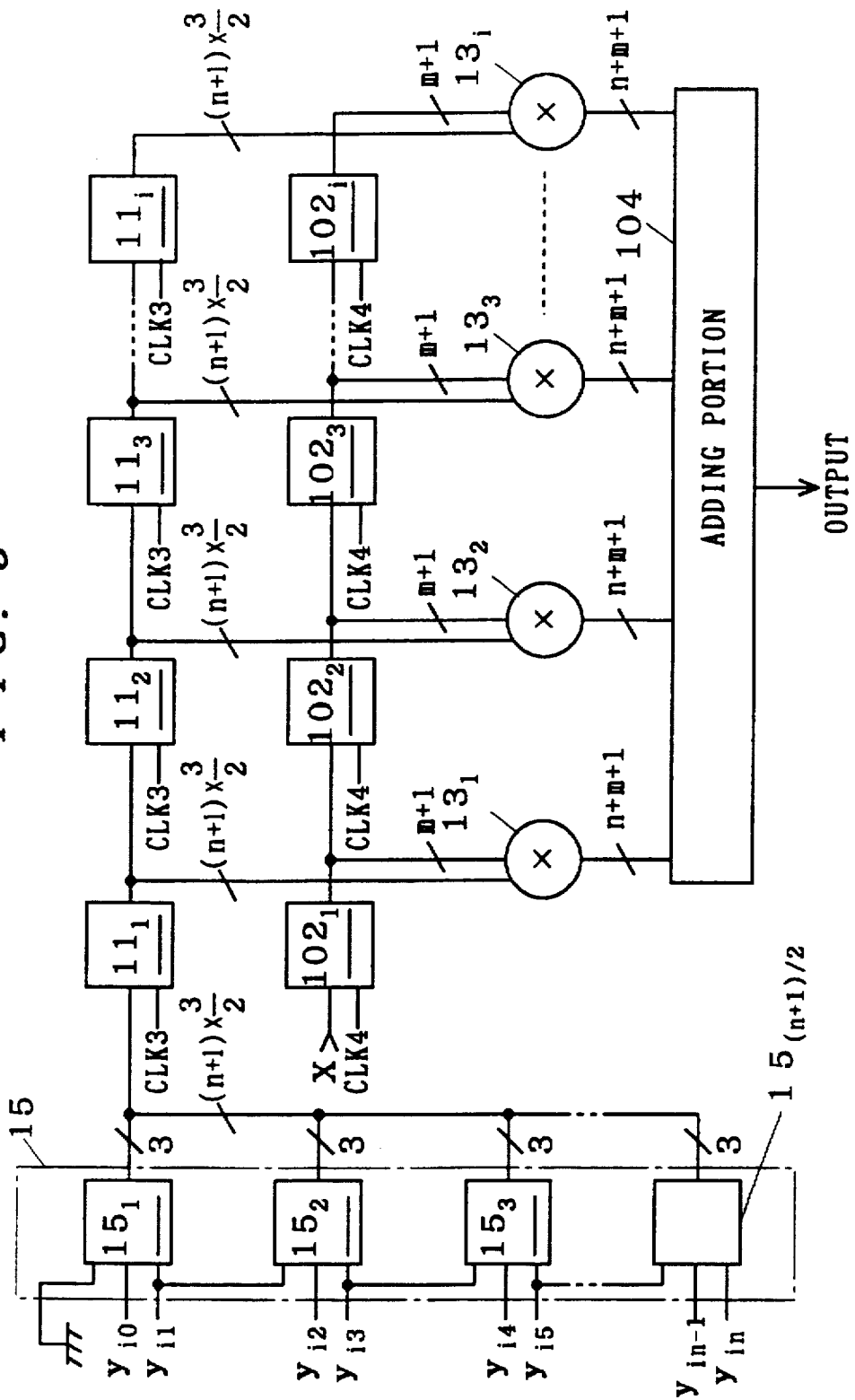
FIG. 3 is a block diagram showing the configuration of a digital filter according to the second preferred embodiment of the present invention.
Figure 12:
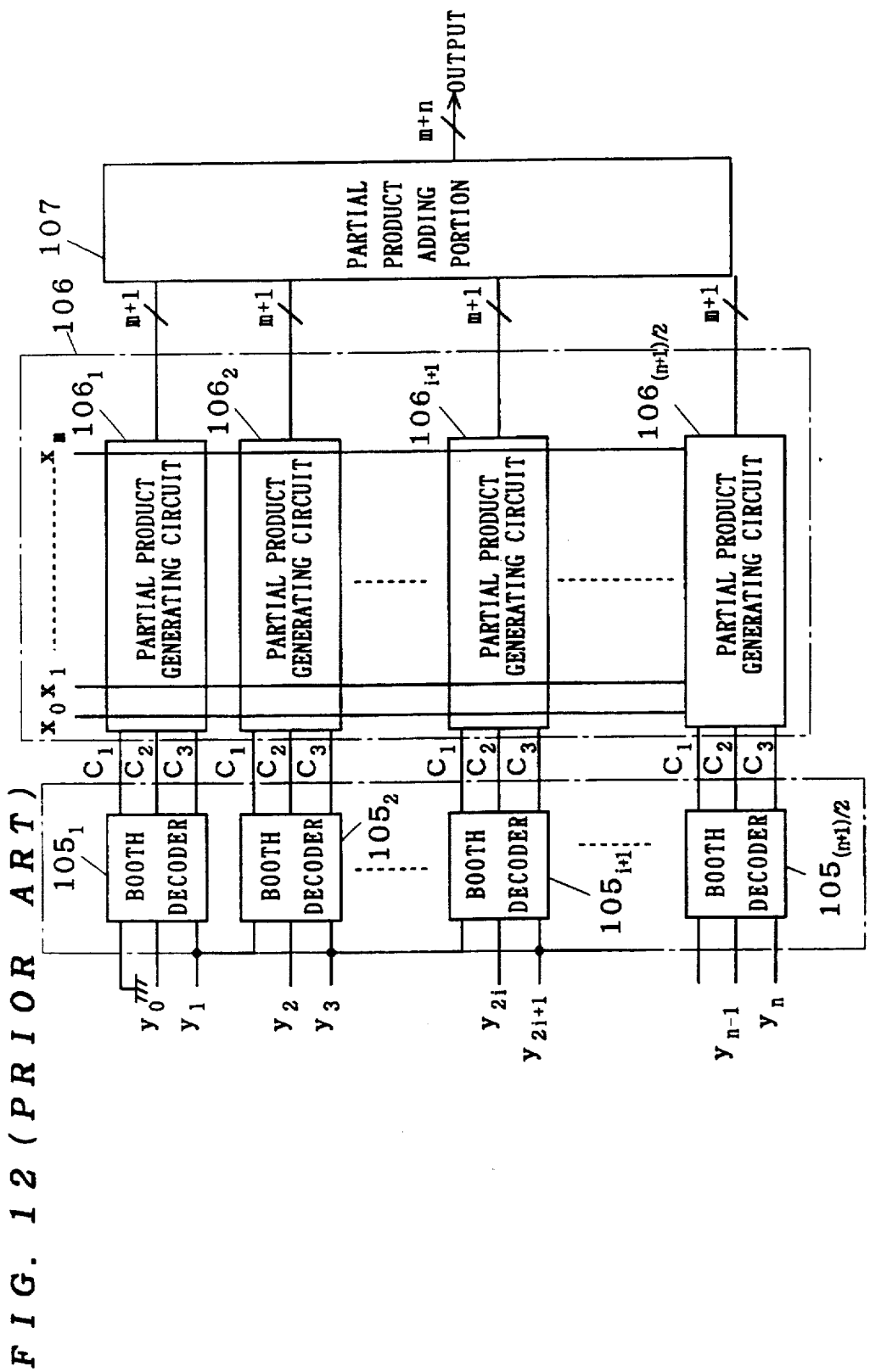
FIG. 12 is a block diagram showing the configuration of the multiplier used in the digital filter shown in FIG. 11.
Figure 13:
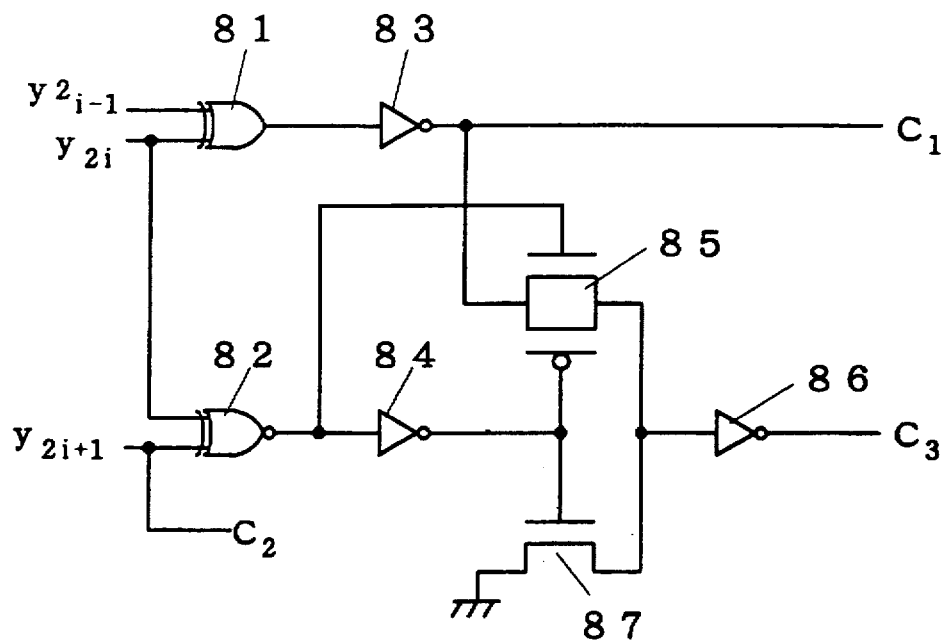
FIG. 13 is a circuit diagram showing the configuration of the Booth decoder of the multiplier shown in FIG. 12.
Figure 14:
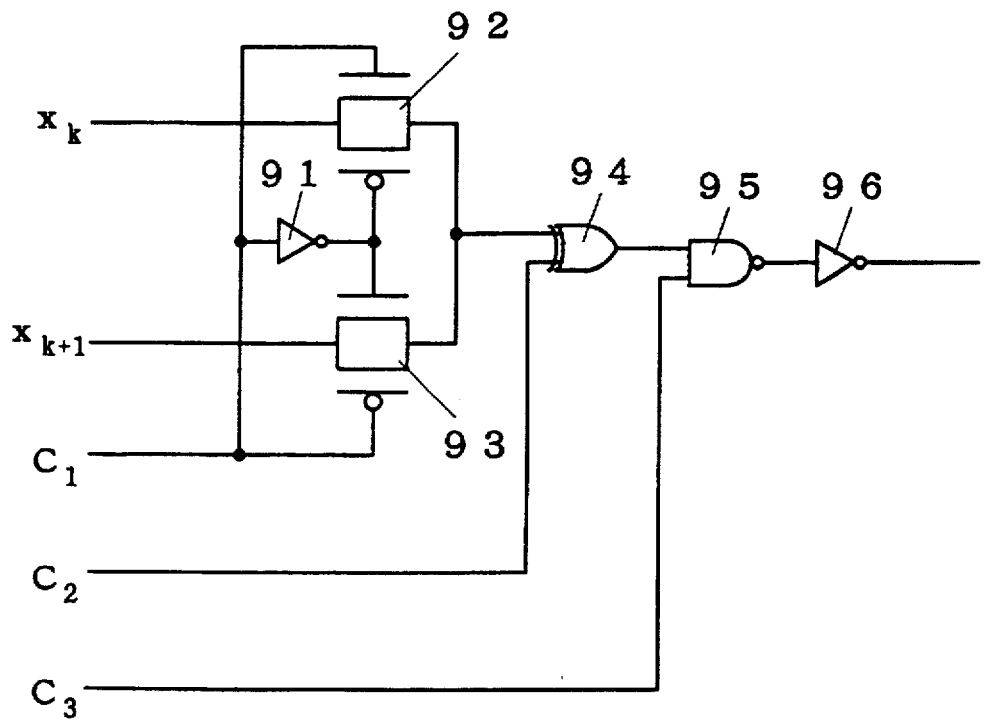
FIG. 14 is a circuit diagram for describing the configuration of the partial product generating circuit of the multiplier shown in FIG. 12.

The first preferred embodiment of the present invention will now be described referring to FIG. 1 and FIG. 2. FIG. 1 is a block diagram showing the configuration of a multiplier according to the first preferred embodiment of the present invention. In FIG. 1, 1 through 3 denote D-flip-flops for respectively storing each bit of successive three bits of a coefficient sequentially inputted according to a clock CLK1. 4 denotes a Booth decoder for outputting control signals $C_1$–$C_3$ according to the values of the three bits stored in the flip-flops 1–3. $5_1$-$5_{(n+1)/2}$ denote registers for storing the control signals $C_1$–$C_3$ outputted from the Booth decoder 4, and the same reference characters as those in FIG. 12 denote parts corresponding to those designated by the same reference characters in FIG. 12. The control signals $C_1$–$C_3$ decoded in the Booth decoder 4 are stored in the register $5_1$ 1 first. The registers $5_1$-$5_{(n+1)/2}$ are connected in series. The control signals $C_1$–$C_3$ stored in the register $5_1$ are shifted in accordance with a clock CLK2 and sequentially transmitted to the registers $5_2$-$5_{(n+1)/2}$ and stored. Accordingly, the Booth decoders $105_1$-$105_{(n+1)/2}$ conventionally provided corresponding to the partial product generating circuits $106_1$-$106_{(n+1)/2}$ can be reduced only to the Booth decoder 4.

First, when the circuit is started, bits forming a coefficient are serially inputted from the most significant bit (referred to as MSB, hereinafter). The relation between the data stored in the flip-flops 1–3 and the timing of decoding when the coefficient is inputted is shown in FIG. 2. The clock CLK1 is for operating the flip-flops 1–3, which is operated in n+2 periods and then fixed to a low level. The clock CLK2 is for operating the registers $5_1$-$5_{(n+1)/2}$ which is operated in n/2 periods and then fixed to a low level. In FIG. 2, D1–D3 denote data stored in the flip-flops 1–3 and D4 denotes data stored in the register $5_1$.

At the time t1, when the clock CLK1 rises, the value of the bit $y_n$, which is the MSB of the coefficient Y, is stored in the flip-flop 1. Next, at the time t2, the content of storage in the flip-flop 1 is shifted to the flip-flop 2, and the value of the bit $y_{n-1}$ is stored in the flip-flop 1. At the time t3, the content of storage in the flip-flop 2 is shifted to the flip-flop 3, and the content of storage in the flip-flop 1 is shifted to the flip-flop 2. Then, the value of the bit $y_{n-3}$ is stored in the flip-flop 1. From the time t1 to the time t3, the clock CLK2 is fixed to the low level and the registers $5_1$-$5_{(n+1)/2}$ do not operate. At the time t4, the clock CLK2 rises and the value BD1 of the control signal $C_1$–$C_3$ outputted from the Booth decoder 4 in accordance with the values of the bits $y_n, y_{n-1}, y_{n-2}$ is stored in the register $5_1$. Subsequently, the clock CLK1 rises and then the values of the bits $y_{n-1}$ to $y_{n-3}$ are stored in the flip-flops 1–3. At the time t5, at a rise of the clock CLK1, the contents of storage in the flip-flops 1–3 are rewritten and the values of the bits $y_{n-2}$ to $y_{n-4}$ are stored, respectively. During this time period, as the clock CLK2 does not rise, the content of storage in the register $5_1$ does not change. At the time t6, the clock CLK2 rises, the content BD1 stored in the register $5_1$ is moved to the register $5_2$, and the register $5_1$ stores the value BD2 of the control signal $C_1$–$C_3$ outputted from the Booth decoder 4 in accordance with the values of the bits $y_{n-2}$, $y_{n-3}$, $y_{n-4}$. Next, the clock CLK1 rises and the values of the bits $y_{n-3}$ to $y_{n-5}$ are stored in the flip-flops 1–3. After that, the same operation from the time t4 to t6 is repeated and the value of the flip-flop 1 is fixed to the low level at the time t7, and then the values of the bits $y_0$, $y_1$ are stored in the flip-flops 2 and 3, respectively. The content of storage in the flip-flop 1 is the 1 bit added to the bits forming the coefficient. Then, at the time t8, the clock CLK2 rises and the value $BD_{(n+1)/2}$ of the control signal $C_1$–$C_3$ is stored in the register $5_1$.

The contents of the shift registers $5_1, \ldots, 5_{(n+1)/2}$ are settled at the time when the (n+1)/2-th clock of the clock CLK2 rises, and the contents of storage in the respective registers are $BD_1, \ldots, BD_{(n+1)/2}$ at that time, respectively. The coefficient is thus settled, and the partial product generating circuits $106_1$–$106_{(n+1)/2}$ can now compute partial products with the multiplicand $x_0, \ldots, x_m$. With such configuration, one multiplier requires one Booth decoder, and the circuit scale of the multiplier can therefor be reduced. Furthermore, by using the multiplier shown in the first preferred embodiment of the present invention in a circuit which uses a large number of multipliers, such as the digital filter, its circuit scale can significantly be reduced.

Second Preferred Embodiment

Figure 4:
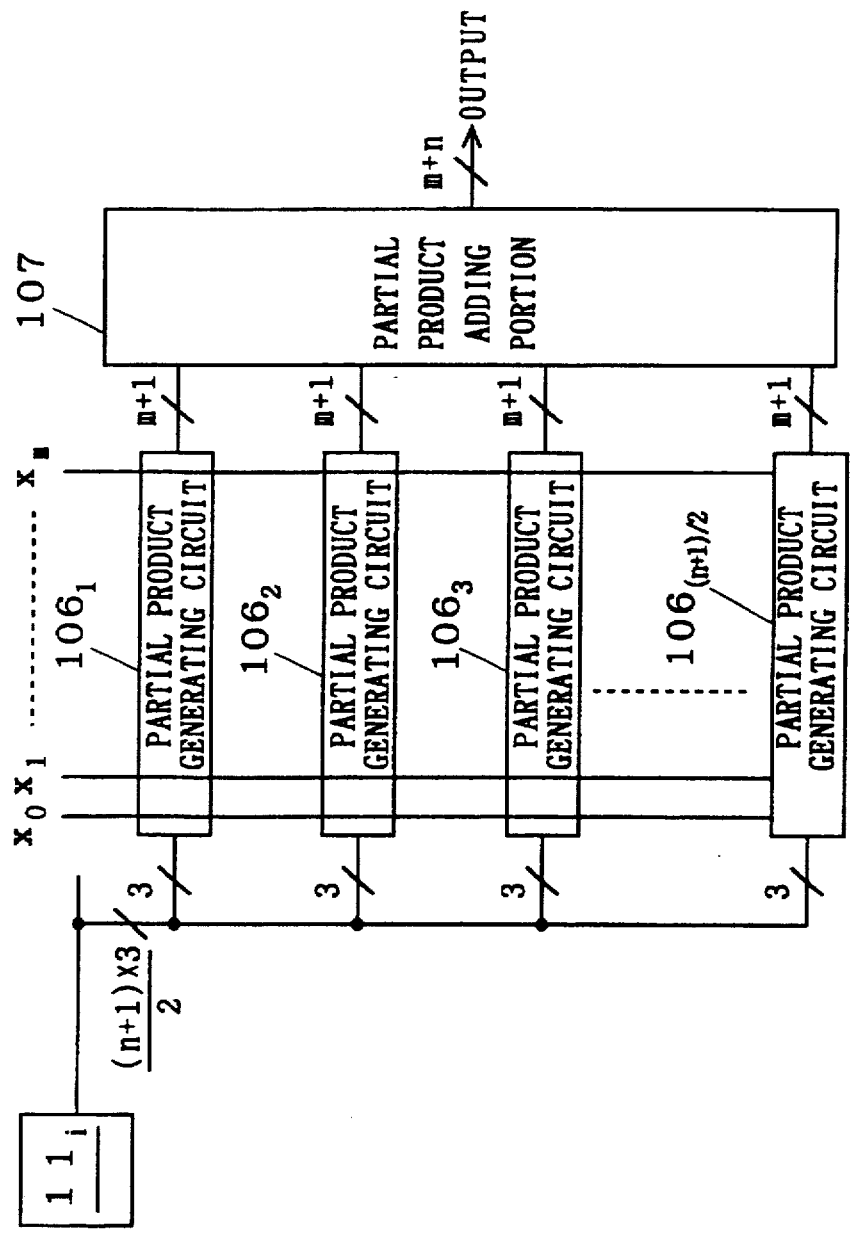
FIG. 4 is a block diagram showing an example of the configuration of the multiplier used in the digital filter shown in FIG. 2.
Figure 5:
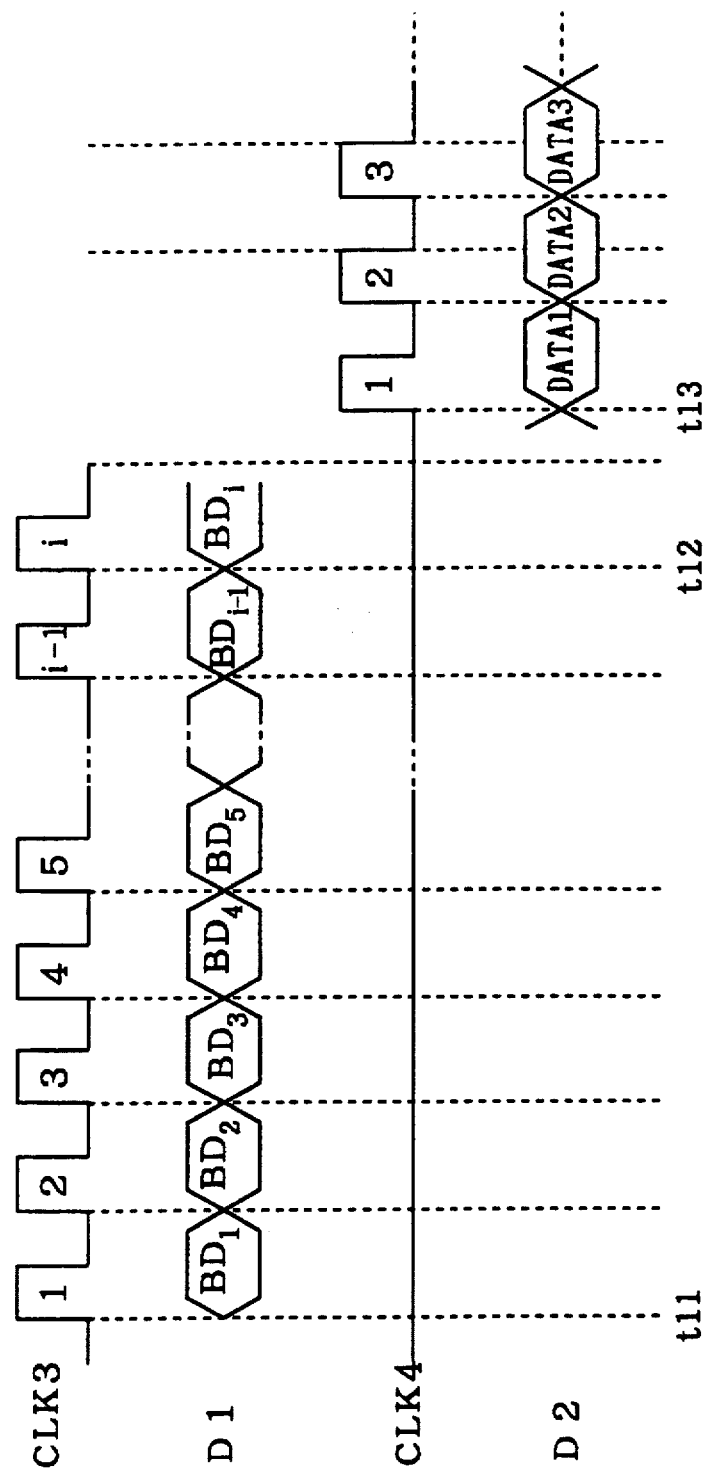
FIG. 5 is a timing chart showing the operation of the digital filter shown in FIG. 3.
Figure 11:
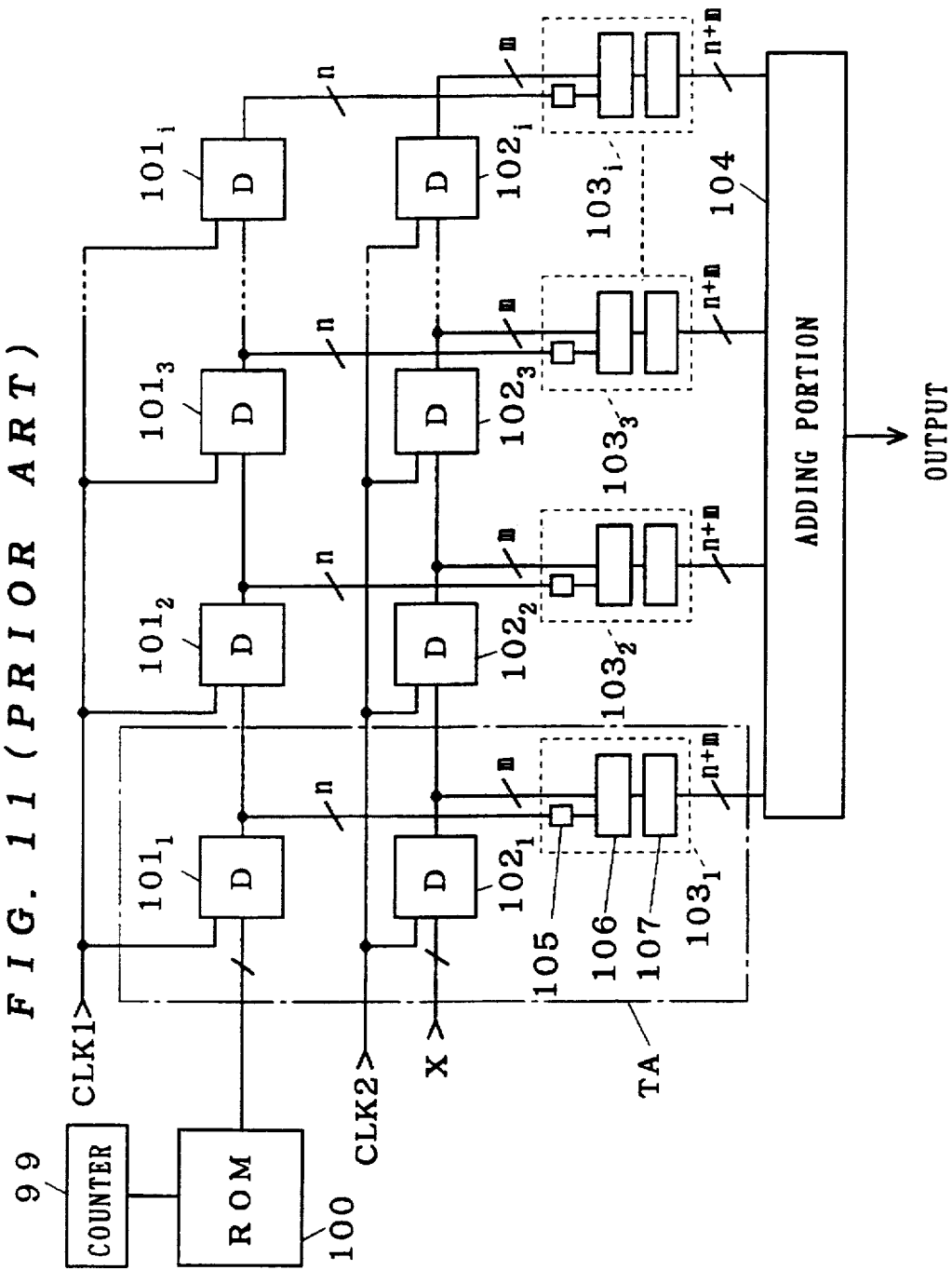
FIG. 11 is a block diagram showing the configuration of a conventional digital filter.

Now, the second preferred embodiment of the present invention will be described referring to FIG. 3 through FIG. 5. FIG. 3 is a block diagram showing the configuration of a digital filter according to the second preferred embodiment of the present invention. In FIG. 3, $11_1$–$11_i$ denote registers including a plurality of storage elements for respectively storing a plurality of sets of control signals $C_1$–$C_3$ for controlling a plurality of partial product generating circuits, $13_1$–$13_i$ denote multipliers for performing multiplication of the coefficient and the data respectively stored in the registers $11_1$–$11_i$ and the registers $102_1$–$102_i$, and 15 denotes a Booth decoder group including a plurality of Booth decoders $15_1$–$15_n$, and the same characters as those in FIG. 11 denote parts corresponding to those in FIG. 11. The registers $11_1$–$11_i$ include a plurality of storage elements or registers corresponding to the plurality of registers $5_1$–$5_{(n+1)/2}$ shown in FIG. 1, and those registers are not connected in series, but they are connected in parallel so as to respectively receive outputs of the Booth decoders $15_1$–$15_n$.

Input signals $y_{i0}, \ldots, y_{in}$ are coefficient data, and input signals $x_0, \ldots, x_m$ are multiplicand data. The digital filter shown in FIG. 3 is a filter with i taps having i multipliers $13_1$–$13_i$.

The bits $y_{i0}$–$y_{in}$, $\ldots$, $y_{1n}$ forming coefficients $Y_1$–$Y_i$ are sequentially inputted to the respective Booth decoders $15_1$–$15_n$. Then, the data decoded in the booth decoder group 15 are stored while sequentially moved through the registers $11_1$–$11_i$. Data obtained by decoding the bits forming the coefficient are directly provided to each of the multipliers $13_1$–$13_i$. With such configuration, one booth decoder group 15 only is required in one digital filter and each multiplier $13_1$–$13_i$ used in the digital filter does not require a Booth decoder group, as shown in FIG. 4, and thus the circuit scale of the digital filter can be reduced. Accordingly, the i×(n+1)/2 Booth decoders, which are conventionally provided in the multipliers $103_1$–$103_i$ shown in FIG. 11, can be reduced to the (n+1)/2 Booth decoders. In FIG. 4, the same reference characters as those in FIG. 12 denote parts corresponding to those with the same reference characters in FIG. 12, where the partial product generating circuits $106_1$–$106_{(n+1)/2}$ are provided with the control signals $C_1$–$C_3$ directly from the register $11_i$.

Next, the operation will be described referring to the timing chart shown in FIG. 5. In FIG. 5, D1 denotes data stored in the register $11_1$, and D2 denotes data stored in the register $102_1$. The coefficients are loaded in order from the coefficient required in the tapi. When the digital filter is started at the time t11, the coefficient $Y_i$ is loaded from the outside. The coefficient data is inputted to the Booth decoder group 15 for each bit, and outputs of the Booth decoders $15_1$–$15_{(n+1)/2}$ are transferred to the register $11_1$ which holds control signals related to each coefficient at the timing of rise of the clock CLK3. The transferred data moves through the registers $11_1$–$11_i$ connected in series according to the clock CLK3. By repeating such operation i times, control signals corresponding to the coefficients $Y_1$–$Y_i$ are stored in the registers $11_1$–$11_i$. At the time t12, storage of control signals into the registers $11_1$–$11_i$ is completed. The clock CLK3 repeats i times and then it is fixed to a low level. After that, at the time t13, a clock CLK4 for providing operation timing of the registers $102_1$–$102_i$ for holding the data rises and the data DATA1 is stored in the register $102_1$. Furthermore, every time the clock CLK4 rises, the data DATA2-DATAi are inputted sequentially to the register $102_1$ and transferred to the registers $102_1$–$102_i$ and stored.

The multipliers $13_1$–$13_i$ compute products of the coefficients $Y_1$–$Y_i$ and the data $X_1$–$X_i$ using the control signals relative to the coefficients and the data stored respectively in the corresponding registers $11_1$–$11_i$ and registers $102_1$–$102_i$ and outputs them to the adding portion 104. The adding portion 104 computes the total sum of outputs of the multipliers $13_1$–$13_i$.

Generally, in the digital filter, as the coefficients are fixed, the coefficients are processed at the initial time of operation of the digital filter and control signals are stored in the registers $11_1$–$11_i$, so that the operation of the digital filter does not become slower than the conventional case while performing filtering of the data.

Third Preferred Embodiment

Figure 6:
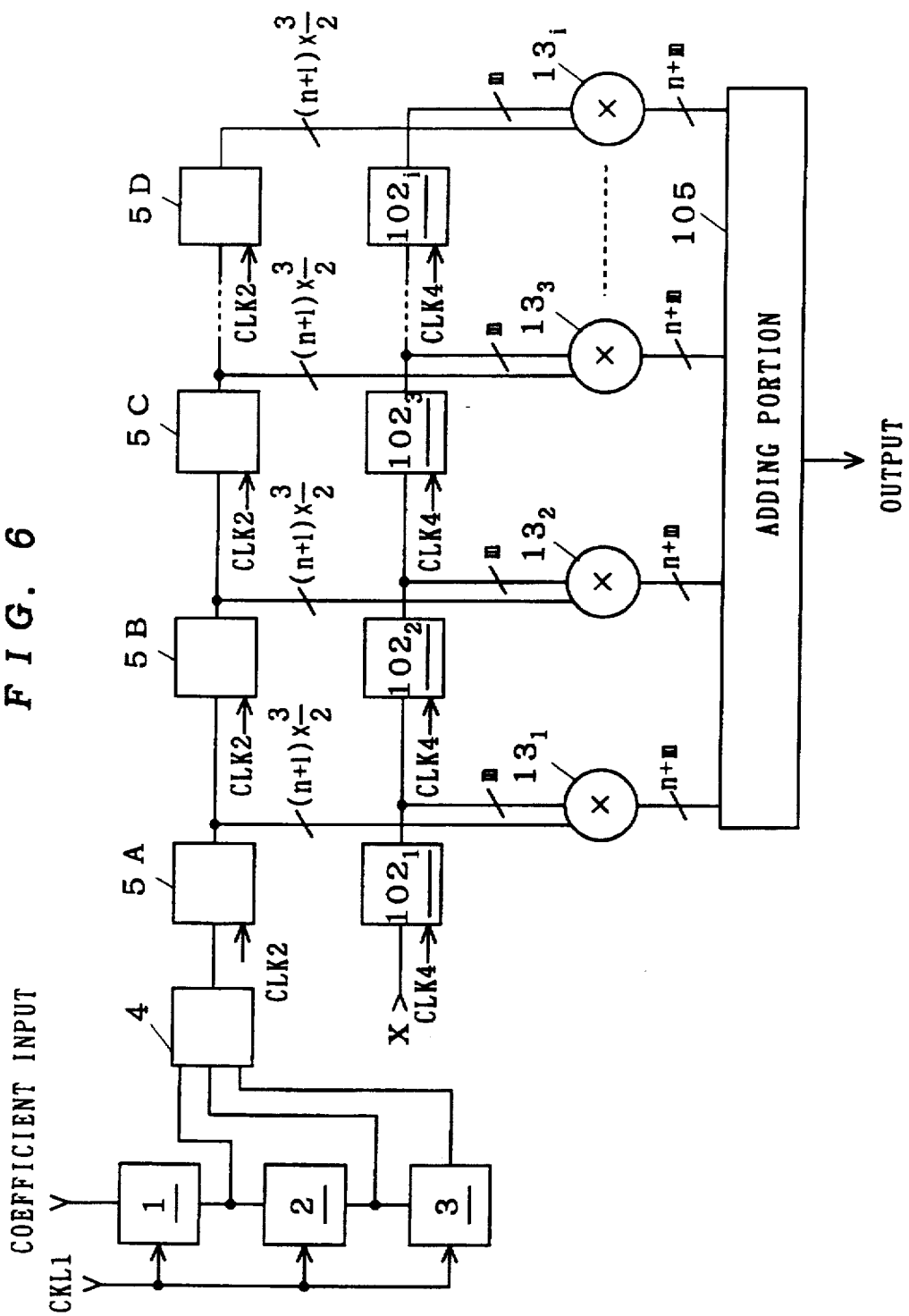
FIG. 6 is a block diagram showing the configuration of a digital filter according to the third preferred embodiment of the present invention.

Next, a digital filter according to the third preferred embodiment of the present invention will be described referring to FIG. 6. FIG. 6 is a block diagram showing the configuration of a digital filter according to the third preferred embodiment of the present invention. In FIG. 6, 1 through 3 denote D-flip-flops for storing each bit of successive three bits of a coefficient sequentially inputted in accordance with the clock CLK1, 4 denotes a Booth decoder for outputting control signals $C_1$–$C_3$ in accordance with values of the three bits stored in the flip-flops 1–3 and 5A–5D denote registers connected in series for storing the control signals $C_1$–$C_3$, outputted from the Booth decoder 4, for one coefficient, and the same reference characters as those in FIG. 3 denote parts corresponding to those designated by the same reference characters in FIG. 3. The register 5A includes a plurality of registers similar to the registers $5_1$–$5_{(n+1)/2}$ connected in series, shown in FIG. 1. It is the same as to the registers 5B–5D. The registers 5A–5D are connected in series, where the output of the register $5_{(n+1)/2}$ in the register 5A becomes an input to the register $5_1$ in the resister 5B, for example. The control signals $C_1$–$C_3$ decoded in the Booth decoder 4 are first stored in the register $5_1$ in the register 5A. The registers $5_1$–$5_{(n+1)/2}$ in the register 5A are connected in series, where the control signals $C_1$–$C_3$ stored in the register $5_1$ in the register 5A are shifted according to the clock CLK2 and sequentially transferred to the registers $5_2$–$5_{(n+1)/2}$ in the register 5A and stored. Furthermore, data stored in the registers $5_1$–$5_{(n+1)/2}$ in the register 5A are sequentially transferred to the registers $5_1$-$5_{(n+1)/2}$ in the register 5B in accordance with the clock CLK2 and stored. First, when the circuit is started, it is serially inputted from the MSB side of bits forming the coefficient $Y_i$. The clock CLK1 is for operating the flip-flops 1–3, which operates in (n+2)×i periods and it is then fixed to a low level.

As configured as described above, in comparison with the digital filter of the second preferred embodiment, the Booth decoders $105_1$-$105_{(n+1)/2}$ provided corresponding to the partial product generating circuits $106_1$-$106_{(n+1)/2}$ can be reduced to the Booth decoder 4 only in the digital filter of the third preferred embodiment.

In the registers $102_1$-$102_i$ for holding the data shown in FIG. 6, the clock CLK4 rises after the control signals related to the coefficient are stored in the registers 5A–5D and data transfer and storage are performed in the same way as the digital filter according to the second preferred embodiment.

Although the description has been made on the case where all of the plurality of registers in the register 5A to register 5D are connected in series in the above-described preferred embodiment, such configuration will also work where the plurality of registers in the register 5A and the plurality of registers in the register 5B are connected in parallel, i.e., the register $5_1$ in the register 5A and the register $5_1$ in the register 5B are connected, for example, in which case data transfer is made between the registers 5A–5D in accordance with another clock than the clock CLK2 every time the control signals about one coefficient are stored in all the registers in the register 5A.

Fourth Preferred Embodiment

Figure 7:
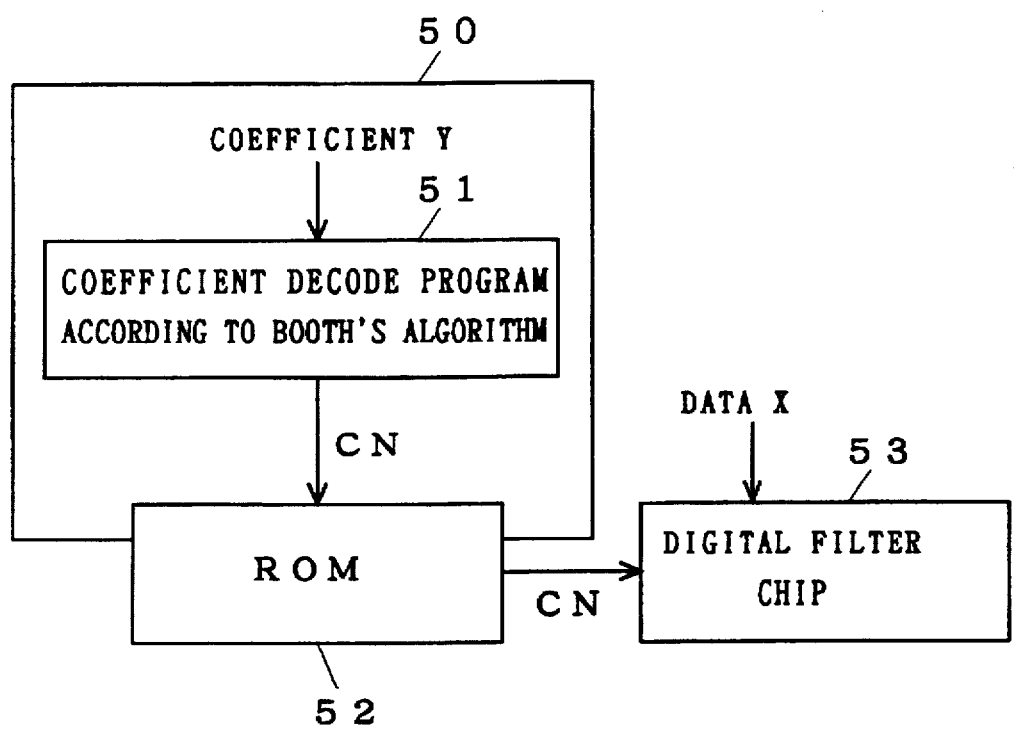
FIG. 7 is a block diagram showing the configuration of a system including a digital filter according to the fourth preferred embodiment of the present invention.
Figure 8:
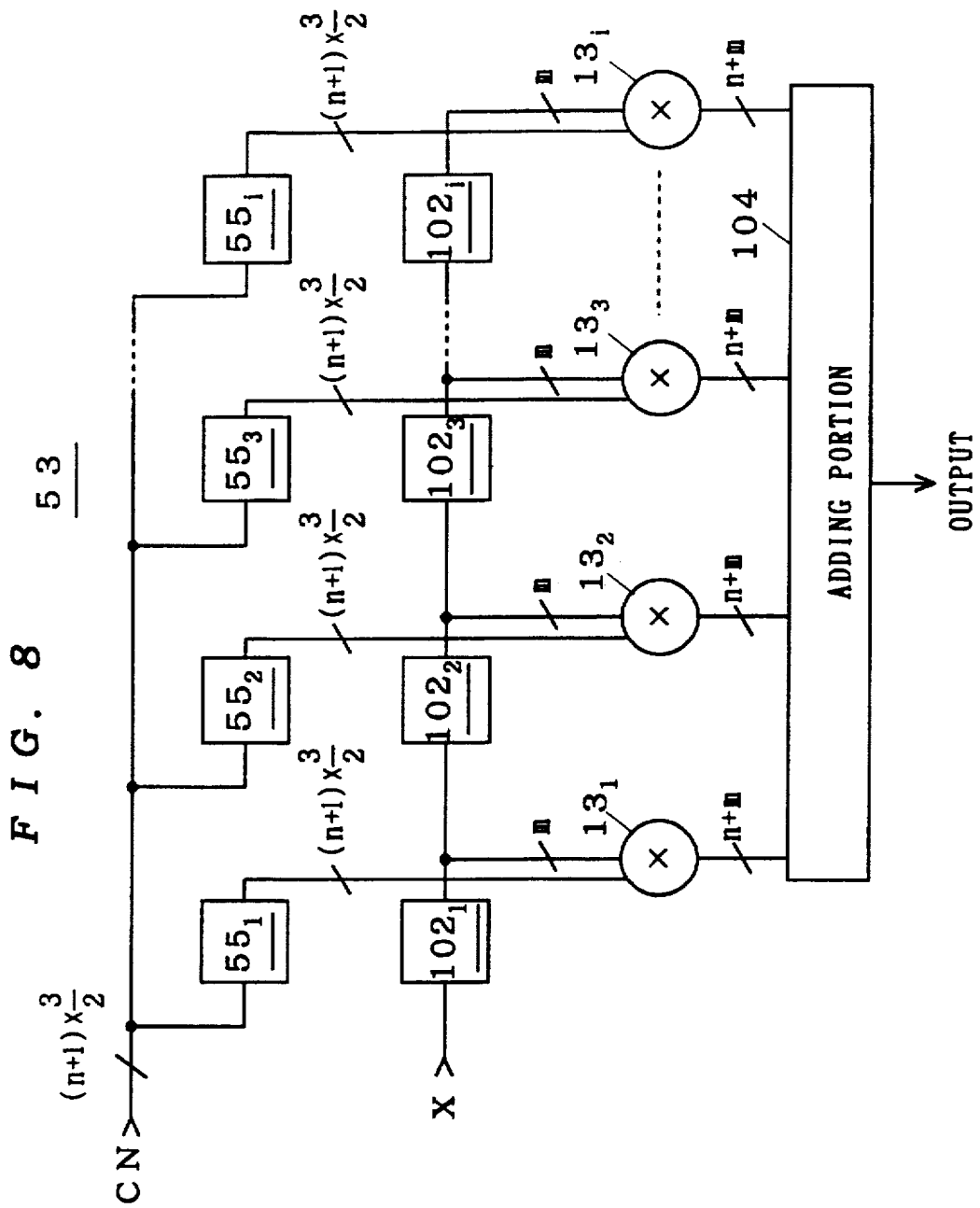
FIG. 8 is a block diagram showing an example of the configuration of the digital filter according to the fourth preferred embodiment of the present invention.

Next, a digital filter according to the fourth preferred embodiment of the present invention will be described referring to FIG. 7 through FIG. 9. Although the configuration has been shown where the coefficient is decoded according to the Booth's algorithm in a semiconductor integrated circuit on one semiconductor chip to perform multiplication in the digital filters according to the second and third preferred embodiments of the present invention, decode of the coefficient according to the Booth's algorithm may be prepared in advance. A system for performing decode in accordance with the Booth's algorithm is then required. FIG. 7 is a block diagram showing the relation between a digital filter according to the fourth preferred embodiment and a system for using the same. In FIG. 7, 50 denotes a computer for executing a coefficient decode program 51 according to the Booth's algorithm to generate control signal CN from a coefficient, 52 denotes a ROM connected to the computer 50 for storing the control signal CN generated by the computer 50, and 53 denotes a digital filter, which is formed of an integrated circuit formed on a single chip, receiving the control signal CN related to the coefficient for filtering the data X. FIG. 8 is a block diagram showing the configuration of the digital filter formed on the digital filter chip 53. In FIG. 8, $55_1$-$55_i$ denote registers for holding the control signal CN provided from the ROM 52 and those designated by the same reference characters as those in FIG. 3 denote parts corresponding to those with the same reference characters in FIG. 3. The provided control signal CN is a control signal which is obtained by previously decoding the coefficient in the computer 50 to enable multiplication according to the Booth's algorithm, so that it is not necessary to provide a Booth decoder in the digital filter chip 53. Hence, the Booth decoder group can be removed and therefore the circuit scale of the digital filter chip 53 can be reduced, with the multipliers $13_1$-$13_i$ used in the digital filter having such configuration as shown in FIG. 4.

Figure 9:
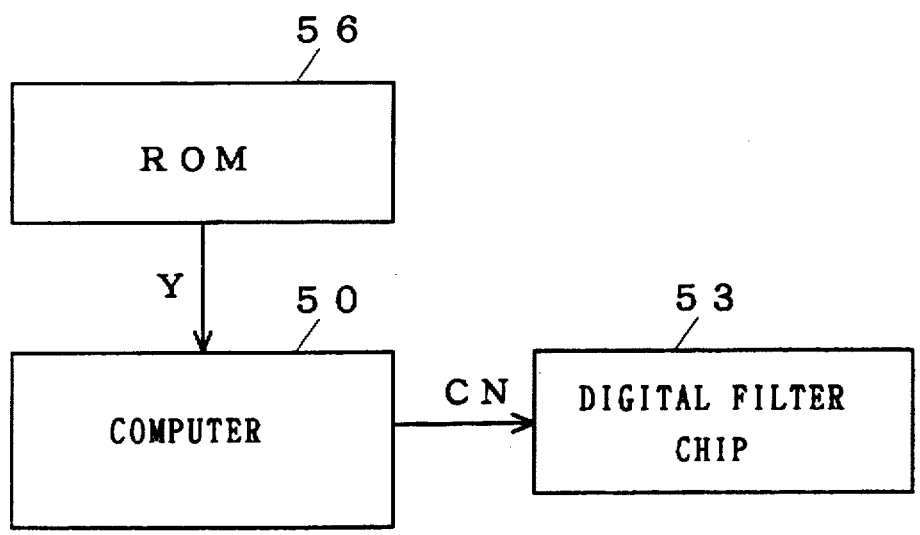
FIG. 9 is a block diagram showing another configuration of the system including the digital filter according to the fourth preferred embodiment of the present invention.

Although the control signal CN processed in the computer 50 is stored in the ROM 52 in the preferred embodiment described above, the computer 50 and the digital filter chip 53 may be directly connected as shown in FIG. 9 and the coefficient Y may be provided to the computer 50 from a ROM 56, which will produce the same effects as those in the above-described preferred embodiment.

The digital filter formed on the digital filter chip 53 may have the configuration of the digital filter shown in the second or third preferred embodiment, in which case the standard of the control signal CN and interconnections will be altered and the bits forming the data are serially provided for each coefficient or about all the coefficients.

Figure 10:
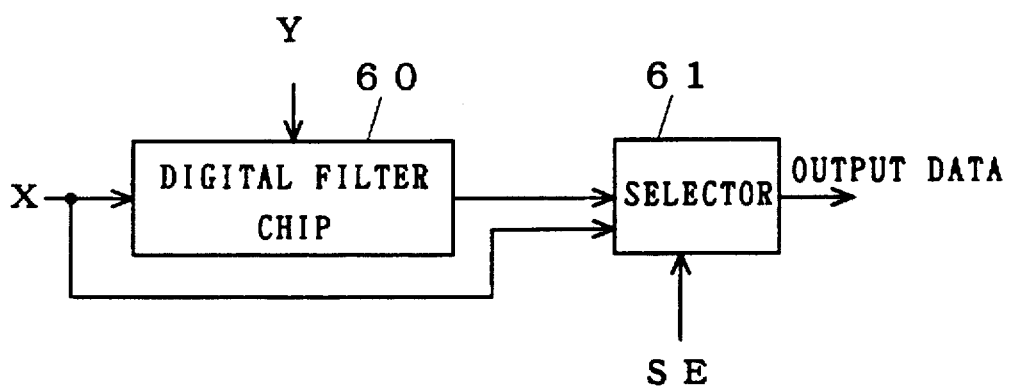
FIG. 10 is a block diagram showing an example of a method for using the digital filter according to the present invention.

Next, one example of a method of using the digital filter described in the preferred embodiments above will be described referring to FIG. 10. In FIG. 10, 60 denotes a semiconductor chip with the digital filter, shown in the second and third preferred embodiments, formed therein, and 61 denotes a selector supplied with the output of the digital filter 60 and the data X as inputs for outputting one of them in accordance with a control signal SE. The description has been made on the case where the coefficient Y is fixed in the second and third preferred embodiments, but the coefficient Y may have to be changed while filtering with the digital filter. At that time, as shown in FIG. 10, it is so set as to directly output the data X from the selector 61 with the select signal SE and it is so switched as to output the output of the digital filter chip 60 from the selector 61 after the change of the coefficient Y is completed. Then, data X with a trouble is not outputted when the coefficient in the digital filter chip 60 is exchanged, and the exchange of the coefficients of the digital filter can be made with ease. Although it is not shown in FIG. 10, a delay line may be used to delay the data X inputted to the selector 61 to consider a processing time in the digital filter chip 60.

While the invention has been described in detail, the foregoing description is in all aspects illustrative and not restrictive. It is understood that numerous other modifications and variations can be devised without departing from the scope of the invention.

We claim:

1. A digital filter comprising:

a source of coefficient data;

a Booth decoder provided with a plurality of Booth decoding portions providing a set of three coefficient control signals relative to three bits of coefficient data supplied to each Booth decoding portion, wherein at least one coefficient data bit supplied to each adjacent Booth decoding portion is supplied in common;

plural sets of Booth control coefficient storage elements, each set of Booth control coefficient storage elements equal in number to the Booth decoding portions, with a Booth control coefficient output from Booth decoding portions being connected to inputs of each set of the Booth control coefficient storage elements, wherein each Booth control coefficient storage element has a control input;

a multiplicand data source;

a plurality of second data storage elements equal in number to the plural sets of Booth control coefficient storage elements, with each of the plurality of second data storage elements being connected to receive multiplicand data from the multiplicand data source, wherein each second data storage element has a control input;

a plurality of multiplier circuit portions equal in number to the plurality of second data storage elements, said plurality of multiplier circuit portions each being connected to an output from each of the second data storage elements and to an output from each of the Booth control coefficient storage elements;

a control signal generator producing control signals and being connected to the control input of each Booth control coefficient storage element and the control input of each of the second data storage elements to enable transfer of plural sets of Booth control coefficient data from the Booth decoder portions to the plural sets of Booth control coefficient storage elements and a subsequent parallel transfer of the plural sets of Booth control coefficient data from each set of the Booth control coefficient storage elements to each of the multiplier circuit portions and to enable parallel transfer of multiplicand data from each of the second data storage elements to each of multiplier circuit portions to form partial products; and an adding circuit connected to the multiplier circuit portions to form a sum of outputs from the multiplier circuit portions.

2. The digital filter of claim 1, wherein the plurality of sets of Booth control coefficient storage elements are connected in series and transfer a set of Booth coefficient control signal data outputted in series from the Booth decoder from one set of Booth coefficient storage elements to a subsequent set of Booth control coefficient storage elements.

* * * * *